United States Patent
Caumont et al.

(10) Patent No.: US 8,906,531 B2
(45) Date of Patent: Dec. 9, 2014

(54) MODULE FOR ELECTRIC ENERGY STORAGE ASSEMBLIES FOR AGEING DETECTION OF SAID ASSEMBLIES

(75) Inventors: Olivier Caumont, Quimper (FR); Anne-Claire Juventin-Mathes, Quimper (FR); Karine Le Bras, Guilers (FR); Jean-Michel Depond, Quimper (FR)

(73) Assignee: Blue Soloutions, Ergue Gaberic (FR)

( * ) Notice: Subject to any disclaimer, the term of this patent is extended or adjusted under 35 U.S.C. 154(b) by 1120 days.

(21) Appl. No.: 12/599,961

(22) PCT Filed: Feb. 25, 2008

(86) PCT No.: PCT/EP2008/052231
§ 371 (c)(1),
(2), (4) Date: Jan. 19, 2010

(87) PCT Pub. No.: WO2008/141845
PCT Pub. Date: Nov. 27, 2008

(65) Prior Publication Data
US 2010/0304201 A1    Dec. 2, 2010

(30) Foreign Application Priority Data

May 15, 2007 (FR) .................................... 07 55089

(51) Int. Cl.
| H01M 10/50 | (2006.01) |
| H01G 11/82 | (2013.01) |
| H01M 2/20 | (2006.01) |
| H01M 2/10 | (2006.01) |
| H01M 10/42 | (2006.01) |

(52) U.S. Cl.
CPC .............. *H01M 2/1094* (2013.01); *Y02E 60/12* (2013.01); *H01G 11/82* (2013.01); *H01M 2/202* (2013.01); *H01M 10/425* (2013.01); *Y02E 60/13* (2013.01); *H01M 10/42* (2013.01)
USPC .......................... 429/120; 429/178; 429/163

(58) Field of Classification Search
USPC .................................. 429/159, 120, 178, 163
See application file for complete search history.

(56) References Cited

U.S. PATENT DOCUMENTS

| 3,255,387 A | | 6/1966 | Giacomello | |
| 4,431,717 A | * | 2/1984 | Kikuchi | 429/100 |
| 4,724,189 A | * | 2/1988 | Chase | 429/99 |
| 5,227,263 A | * | 7/1993 | Blier | 429/99 |
| 6,410,184 B1 | | 6/2002 | Horiuchi et al. | |
| 6,582,848 B2 | * | 6/2003 | Peterson | 429/99 |
| 6,641,942 B1 | | 11/2003 | St-Germain et al. | |

(Continued)

FOREIGN PATENT DOCUMENTS

| DE | 199 58 411 A1 | 6/2001 |
| DE | 10 2004 035 810 A1 | 2/2006 |

(Continued)

*Primary Examiner* — Milton I Cano
*Assistant Examiner* — Jimmy K Vo
(74) *Attorney, Agent, or Firm* — Blakely Sokoloff Taylor & Zafman

(57) ABSTRACT

Module including a casing (10) in which a plurality of electric energy storage assemblies (20) are arranged so that their longitudinal axis are parallel to one another and perpendicular to an upper wall and a lower wall of the casing. Each electric storage assembly has a first face in thermal contact with and electrically insulated from the lower wall of the casing, and a second face opposite the first face. The second face is capped with a cover electrically connected to the energy storage assembly (20). The upper wall of the casing includes a holder for holding the storage assemblies against the lower wall of the casing which also allows swelling of the covers capping the second faces.

51 Claims, 7 Drawing Sheets

(56) References Cited

U.S. PATENT DOCUMENTS

| | | |
|---|---|---|
| 6,650,531 B2 | 11/2003 | Ikeda et al. |
| 6,942,359 B2 * | 9/2005 | Furth et al. .................. 429/97 |
| 6,952,338 B1 | 10/2005 | Gallay et al. |
| 7,016,177 B1 | 3/2006 | Thrap |
| 2003/0027041 A1 | 2/2003 | Hamada et al. |
| 2003/0064283 A1 * | 4/2003 | Uemoto et al. ............... 429/149 |
| 2003/0067735 A1 | 4/2003 | Wilk et al. |
| 2005/0031945 A1 | 2/2005 | Morita et al. |
| 2006/0120022 A1 | 6/2006 | Thrap |
| 2006/0146480 A1 | 7/2006 | Thrap |
| 2007/0009787 A1 * | 1/2007 | Straubel et al. ............... 429/99 |
| 2007/0009791 A1 | 1/2007 | Young et al. |
| 2007/0082234 A1 * | 4/2007 | Ladouceur et al. ............ 429/9 |

FOREIGN PATENT DOCUMENTS

| | | |
|---|---|---|
| DE | 10 2004 039 231 A1 | 2/2006 |
| DE | 10 2004 045 182 A1 | 4/2006 |
| DE | 10 2004 054 082 A1 | 5/2006 |
| DE | 10 2005 007 607 A1 | 8/2006 |
| EP | 0 033 697 A2 | 8/1981 |
| EP | 0 571 235 A1 | 11/1993 |
| EP | 1 081 824 A2 | 3/2001 |
| EP | 1 291 885 A1 | 3/2003 |
| EP | 1 571 748 A1 | 9/2005 |
| FR | 1.081.226 A | 12/1954 |
| FR | 1.557.516 A | 2/1969 |
| FR | 2 712 733 A1 | 5/1995 |
| FR | 2 863 400 A1 | 6/2005 |
| FR | 2 888 669 A1 | 1/2007 |
| JP | 2002-353078 A | 12/2002 |
| WO | WO 01/80331 A1 | 10/2001 |
| WO | WO 02/49129 A2 | 6/2002 |
| WO | WO 03/092023 A1 | 11/2003 |
| WO | WO 2004/032161 A1 | 4/2004 |
| WO | WO 2005/015585 A1 | 2/2005 |
| WO | WO 2005/086189 A1 | 9/2005 |

* cited by examiner

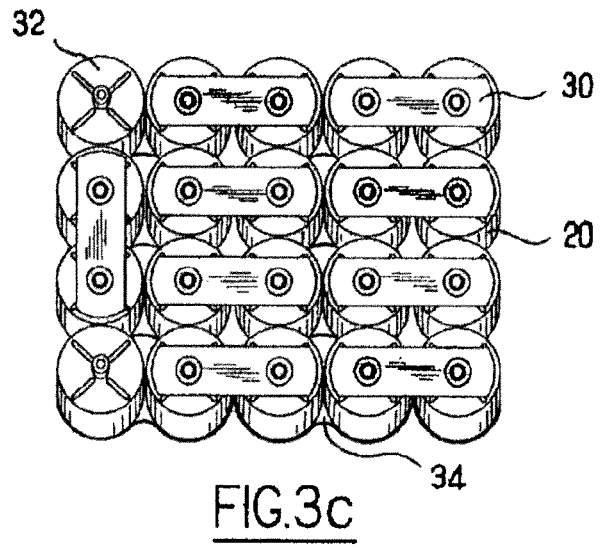
FIG.3c
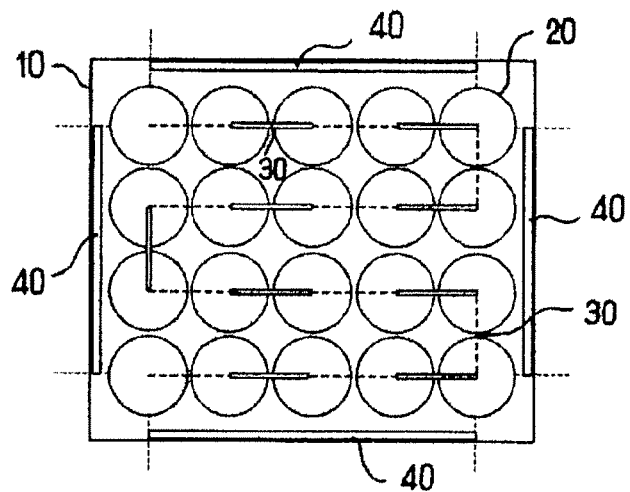
FIG.3d
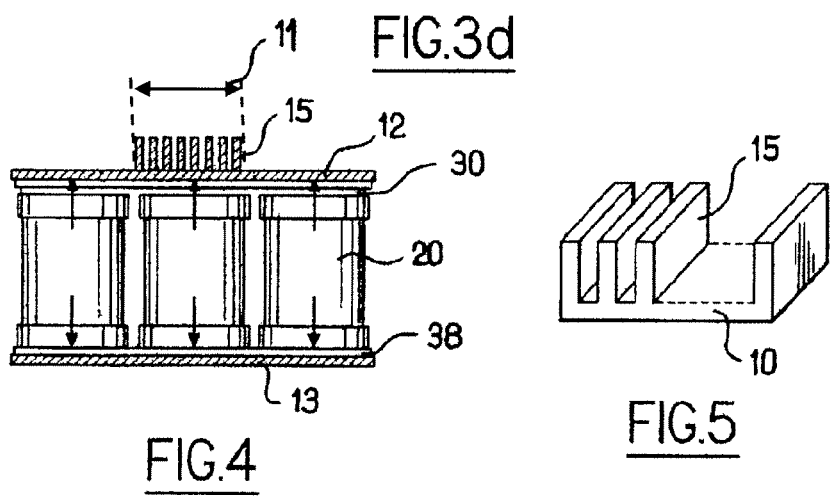
FIG.4
FIG.5

MODULE FOR ELECTRIC ENERGY STORAGE ASSEMBLIES FOR AGEING DETECTION OF SAID ASSEMBLIES

This is a non-provisional application claiming the benefit of International application number PCT/EP2008/052231 filed Feb. 25, 2008.

The present invention concerns the general technical area of electric energy storage assemblies.

More particularly, the invention concerns the area of modules comprising at least two electric energy storage assemblies.

Under the present invention, by "electric energy storage assembly" is meant either a capacitor (i.e. a passive system comprising two electrodes and an insulator), or a super-capacitor (i.e. a system comprising two electrodes, an electrolyte and a separator) or a battery of lithium battery type (i.e. a system comprising an anode, a cathode and an electrolyte solution between the anode and the cathode).

GENERAL DESCRIPTION OF THE PRIOR ART

Modules are known such as shown in FIG. 1, comprising a casing 10 in which several electric energy storage assemblies 20 are arranged, linked by connection means 30.

As illustrated schematically FIG. 1, the connection means 30 for the electrical connection of two adjacent storage assemblies comprise two covers 32 and a terminal strip 31.

Each cover 32 is intended to cap a respective storage assembly 20 so that it is electrically connected thereto. Each cover 32 further comprises a connection terminal 33 able to come into contact with a borehole passing through the terminal strip 31, so as electrically to connect two adjacent storage assemblies 20.

If the module comprises more than two storage assemblies 20, the storage assemblies 20 are connected two by two alternately at their upper and lower covers 32.

When in operation, the storage assemblies 20 and the connection means 30 produce heat. To allow evacuation of this heat, the storage assemblies 20 are thermally connected to the casing 10.

For this evacuation the storage assemblies 20 are held against the upper and lower walls 12, 13 of the casing 10 (via the covers 32).

As a storage assembly 20 ages, its internal pressure rises owing to the production of gases by the storage assembly, which the sealed casing prevents from being released.

This rise in pressure causes the cover 32 associated with the storage assembly to swell into a convex shape, causing the inner connections between the storage assembly 20 and its cover 32 to pull away.

This tearing away of the internal connections leads to an increase in the resistance of the storage assembly 20. The end of the lifetime of the storage assembly 20 can therefore be easily detected by following the change in its resistance.

In a module such as described above, the swelling of the covers 32 is blocked by the upper and lower walls 12, 13 of the casing 10 which exert a pressure on the storage assemblies 20 (via the covers).

Therefore, the increase in the resistance of the storage assemblies is not possible, which makes it more difficult to detect the end of the lifetime of a storage assembly, and does alert to the rise in inner pressure of the storage assemblies 20.

The general purpose of the invention is to propose a module with which it is possible to overcome the drawback of the module described above.

PRESENTATION OF THE INVENTION

For this purpose, a module is provided comprising a casing in which at least one electric energy storage assembly is arranged, comprising a first face in thermal contact with, whilst being electrically insulated from, at least one lower wall of the casing, and a second face opposite the first face, the second face being capped by a cover electrically connected to said energy storage assembly, in which the module comprises means enabling the associated storage assembly to be held against the lower wall of the casing and also allowing swelling of the cover capping the second face.

Therefore the module of the invention allows some swelling of the covers associated with the storage assemblies, and hence the detection either of any increase in the internal resistance of a storage assembly of the module, synonymous with the end of the lifetime of the storage assembly concerned, or measurement of the swelling by an associated sensor.

For example, for a given reference of an energy storage assembly, a swelling of 1 mm or 2 or 3 mm will represent the probable remaining lifetime of the said assembly under normal functioning conditions. Knowledge of this information will make it possible to manage preventive maintenance of this module, in relation to the probable remaining lifetime of each of its assemblies.

Preferred, but non-limiting, aspects of the module according to the invention are the following:

the means holding the storage assembly in place may consist of a compressible material, said material being compressed to a nominal value that is sufficiently lower than its maximum compression value to allow swelling of the energy storage assemblies by a thickness lying between the thickness corresponding to said nominal value of the material, and that corresponding to the maximum compression value of said material:

therefore the portion of casing wall located over the storage assembly is able to deform to allow swelling of the cover of the storage assembly; in particular this allows improved holding of the storage assemblies inside the casing whilst authorizing swelling of the covers, and facilitates assembly of the module;

the means to hold the storage assembly comprise at least one cut-out on the inner face of the upper wall of the casing facing the lid, the cut-out extending over the storage assembly and being designed so that at least one portion of the cut-out edge is in thermal contact with, whilst being electrically insulated from:

the storage assembly and/or the connection means of at least two storage assemblies:

to ensure thermal contact between the edges of the cut-out and the cover, and to allow swelling of the cover;

the cut-out is a blind hole of similar cross-section to the cover, the dimensions of the blind hole being smaller than those of the cover of the associated storage assembly, or the cut-out is a blind hole of circular cross-section, the diameter of the blind hole being smaller than that of the associated storage assembly:

to ensure thermal contact between the edges of the blind hole and the cover;

the connection means between two adjacent storage assemblies comprise covers associated with the two storage assemblies and electrically connected to a terminal strip, each cover being intended to be in electric contact with one end of the terminal strip;

the connection means between two storage assemblies comprise the covers associated with the two storage assemblies and electrically connected to a terminal strip, each cover comprising a connection terminal intended to be in electric contact with one end of the terminal strip at a through-borehole of the terminal strip;

the borehole passing through the terminal strip has high surface roughness to promote electric contact with the connection terminal;

the terminal strips may be in copper:

this allows the ohmic resistance of the connection means to be reduced, and thereby losses through Joule effect can be minimized and hence the heat produced by the connection means;

the terminal strips may be in aluminium:

this makes it possible to improve heat conduction between the storage assemblies and the casing, and to reduce the weight of the connection means;

the terminal strips may comprise tin or nickel plating as surface protection and/or improved electric contact;

the connection means between two adjacent storage assemblies comprise two covers electrically connected via a terminal strip, each cover can be transparent laser welded, brazed or joined by diffusion-brazing;

the welding of the terminal strip can be made through preferential thinned regions;

the contact surface between the terminal strip and a cover is preferably equal to or greater than one quarter of the surface of the cover, and further preferably equal to or more than one half of the surface of the cover;

the cut-out may comprise a layer of elastomer material, at least on its edge in thermal contact to further ensure electric insulation from the storage assembly and/or the connection means of the two storage assemblies this ensures thermal contact between the edges of the cut-out and the cover, and allows swelling of the cover;

two adjacent storage assemblies may be electrically connected by a longitudinal part of which the ends form the respective upper and lower covers of each of the adjacent storage assemblies, so as electrically to connect said adjacent storage assemblies;

this makes it possible to maximize the contact surface between the energy storage assemblies and the walls of the casing to promote thermal diffusion towards the casing, whilst the use of connection means made in a single piece makes it possible to reduce the internal resistance of the connection means (and hence heat production through Joule effect);

each end of the longitudinal part comprises radial, preferential thinned regions;

the preferential thinned regions may lie perpendicular two by two and have an angle of 45° with the longitudinal axis of the part;

the preferential thinned regions may lie perpendicular two by two, at least one region of each end extending along the longitudinal axis of the part;

the module may comprise a layer of elastomer between the lower wall and the storage assemblies:

the elastomer layer is used for electrical insulation and thermal connection of the storage assemblies with the lower wall of the casing;

the means to hold the associated storage assembly against the lower wall of the casing, and also allowing swelling of the cover capping the second face, comprise regions of different compressibility;

there may exist regions of different compressibility at each cover of an energy storage assembly, the region located opposite the central part of each cover being less compressible than the region located opposite the circumference of each cover;

there may exist regions of different compressibility in relation to their location facing covers which undergo different temperatures depending upon their position in the module;

the casing may comprise fins on at least one outer face of the casing:

the term fins is used herein to designate any device which can be used to increase the convective exchange surface of a part. It is considered that wall stiffeners as well as radiator ribs may form fins in the meaning of the present patent;

this makes it possible to increase the contact surface between the casing and the outside medium to promote heat exchanges with the outside, and hence to improve cooling of the inside of the module;

the fins are arranged on the outer face of at least one wall of the casing in thermal contact with the heat dissipation elements connected to the storage assemblies;

this makes it possible to improve cooling of the storage assemblies;

the casing may be in aluminium or in a carbon composite material:

this improves thermal conduction between the inside and the outside of the casing, compared with casings in plastic or steel having equivalent mechanical characteristics;

at least one wall in thermal contact with and electrically insulated from the storage assemblies (e.g. the lower wall of the casing) may comprise or be associated with a base in which a cooling device is arranged;

this makes it possible to improve cooling of the storage assemblies;

the cooling device may comprise a circulation circuit for a cooling liquid;

this allows increased heat exchanges between the inside and outside of the module;

the module may further comprise an electronic management board for energy management and diagnosis of the energy storage assemblies;

the electronic management board may be in thermal contact with, whilst being electrically insulated from, at least one side wall of the casing:

the placing in thermal contact and electric insulation of the storage assemblies with respect to a first wall of the casing, and of the electronic board with respect to a second wall (different from the first wall) promotes outward evacuation of the heat produced inside the module by the electronic management board(s), the connection means and the storage assemblies;

in one embodiment, the electronic board is in contact with the inner face of the side wall of the casing; in another embodiment, the electronic board is in contact with the outer face of the side wall of the casing;

the electronic management board may comprise an epoxy resin layer on which a copper printed circuit is bonded, the layer of epoxy resin being in contact with the inner face of the other wall of the casing;

the layer of epoxy resin allows thermal contacting whilst ensuring electrical insulation of the copper printed circuit with respect to the casing;

the electronic management board may comprise a plate in aluminium on the epoxy resin layer, the aluminium plate being in contact with the inner face of the side wall of the casing:

the aluminium plate promotes evacuation of the heat produced by the copper printed circuit towards the wall of the casing;

the module comprises as many electronic management boards as the casing comprises walls, each of said boards being in contact with a respective side wall of the casing:

this improves cooling of the electronic boards, optimizes the volume of the module and contributes towards homogenization of temperatures within the module, the electronic boards then acting as thermal buffer by avoiding dips in temperature of the storage assemblies between the core and the periphery of the module, as compared with prior art modules in which the boards arranged in the centre, above or below the module accentuate the temperature difference between the central storage assemblies and the peripheral storage assemblies; this arrangement has a major effect on the global lifetime of the module, which itself is closely connected with temperature imbalances to which the different storage assemblies of the module may be subjected;

two walls may be in thermal contact with, whilst being electrically insulated from the energy storage assemblies;

this makes it possible to increase the heat exchange surface between the casing and the storage assemblies, and thereby to improve cooling of the storage assemblies;

the two walls in thermal contact with, whilst being electrically insulated from the energy storage assemblies are the upper and lower walls of the casing;

the covers of the storage assemblies may consist of an electrically conductive material able to withstand deformations and forming a barrier against the gases generated in the storage assemblies when functioning.

for example the covers of the storage assemblies may be in aluminium, preferably having an aluminium content of more than 99.5%;

the module may comprise means to detect swelling of the or of each energy storage assembly, these detection means possibly consisting of a pressure sensor arranged inside the shell of the module opposite each assembly, or of a deformation sensor arranged on the covers or terminal strips, or even of a simple switch giving data on swelling of the energy storage assembly under consideration;

the data given by the swelling detection means may be processed by the electronic board (40) for energy management and diagnosis of the energy storage assemblies;

according to one variant, the data given by the swelling detection means may be transmitted by a connector of the module to external means managing energy and diagnosing the energy storage assemblies.

PRESENTATION OF THE FIGURES

Other characteristics, purposes and advantages of the present invention will become further apparent from the following description, given solely for illustration purposes and non-limiting, which is to be read with reference to the appended drawings in which:

FIG. 1 illustrates an embodiment of a prior art module;

FIG. 2, on its left and right sides, illustrates two embodiments of a module according to the invention;

FIGS. 3a to 3d illustrate an embodiment of a module according to the invention;

FIG. 4 illustrates another embodiment of the module;

FIG. 5 illustrates fins in one embodiment of the module;

DESCRIPTION OF THE INVENTION

Different modules of the invention will now be described with reference to FIGS. 2 to 16. In these different Figures, equivalent parts of the module carry the same reference numbers.

Figure 1:
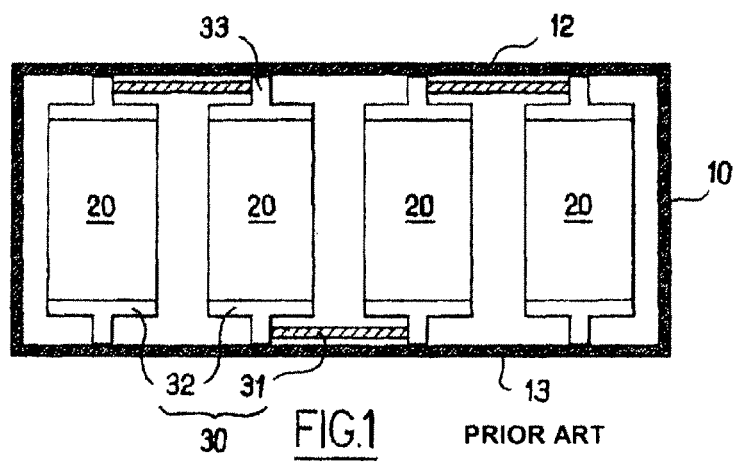
Figure 2:
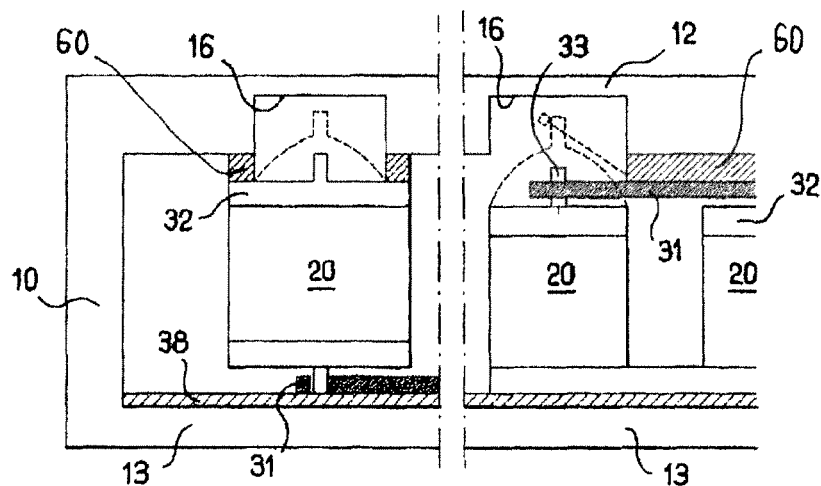

As illustrated FIG. 2, the module comprises a casing 10 in which at least one electric energy storage assembly 20 is arranged.

The storage assembly 20 comprises a first face in thermal contact with whilst being electrically insulated from the lower wall 13 of the casing 10.

The storage assembly 20 also comprises a second face opposite the first face. This second face is capped by a cover 32 electrically connected to the energy storage assembly.

The cover 32 is an element of the connection means 30 used to connect two adjacent storage assemblies 20.

Advantageously, the module comprises means 16 to hold the storage assembly 20 against the lower wall 13 of the casing 10, which also allow swelling of the cover 32 capping the second face.

Therefore, the module of the invention allows swelling of the cover 32 capping the second face of the storage assembly. This permits detection of the end of the lifetime of the storage assembly concerned, either by means of individual sensors on each storage assembly, connected to data processing means, or directly by measuring any increase in the internal resistance of the energy storage assembly.

The sensors, on their carrier wall, can measure either pressure related to swelling of an assembly, or deformation of the cover or of a terminal strip, or they may not measure swelling but merely indicate that a preset swelling level has been reached by means of a simple switch. In all cases, the data collected is transmitted for processing either to a board of the module for energy management and diagnosis, or by a connector of the module to external energy management and diagnosis means of the energy storage assemblies.

In the embodiment illustrated FIG. 2, the means to hold the assembly 20 in place and which also allow swelling of the cover 32 comprise a cut-out 16 on the inner face of the upper wall 12 of the casing 10, opposite the cover 32. The cut-out 16 extends over the storage assembly 20. This cut-out may be a groove or blind hole for example.

If the cut-out is in the form of a blind hole, then the contour is equivalent to that of the shape of the storage assemblies:

therefore, if the assemblies are of cylindrical shape, the blind hole will also be cylindrical. Similarly, if the shape of the storage assemblies is globally square, the blind hole will also be globally square. In all cases, the cut-out is designed so that its dimensions are smaller than those of the cover of the associated storage assembly, so that this assembly despite its swelling always remains in thermal contact with the upper wall of the module via the edge of the cut-out, whilst remaining electrically insulated therefrom.

Alternatively to the cut-outs, the means to hold the associated storage assembly in place against the lower wall of the casing, and which also allow swelling of the cover capping the second face, consist of a compressible material, said material being compressed to a nominal value that is sufficiently lower than its maximum compression value to allow swelling of the energy storage assemblies by a thickness lying between the thickness corresponding to said nominal value of the material and the thickness corresponding to the maximum compression value of said material.

Therefore, when the module is sealed, the material is compressed and holds the storage assemblies in contact with the lower wall of the module. But since the maximum compression level of the material is not reached, the cover of the element is able to swell by a thickness corresponding to the available space until the compressible material reaches its maximum compression.

Figure 12:
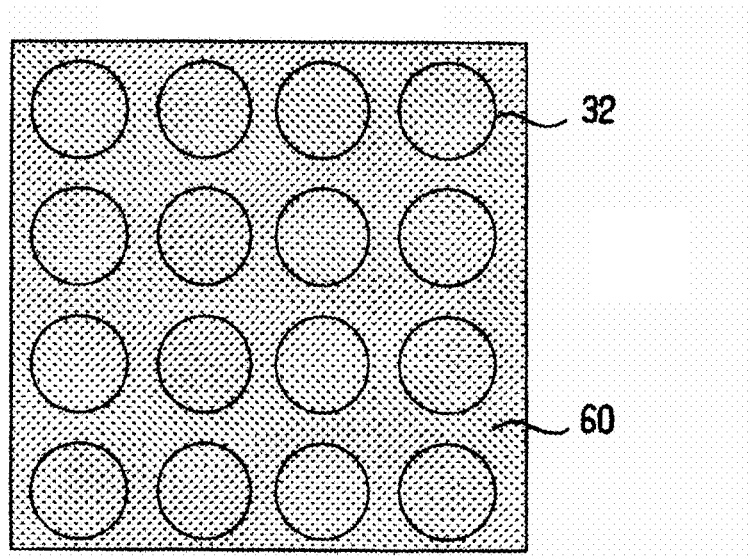
FIGS. 12 and 13 show variants of compressible material comprising, in FIG. 13, regions of different compressibility opposite each cover of a storage assembly.

With reference to FIGS. 12 to 16, the compressible material 60 may comprise various types of embodiments:

In FIG. 12 this material uniformly covers the entirety of the storage assemblies.

Figure 13:
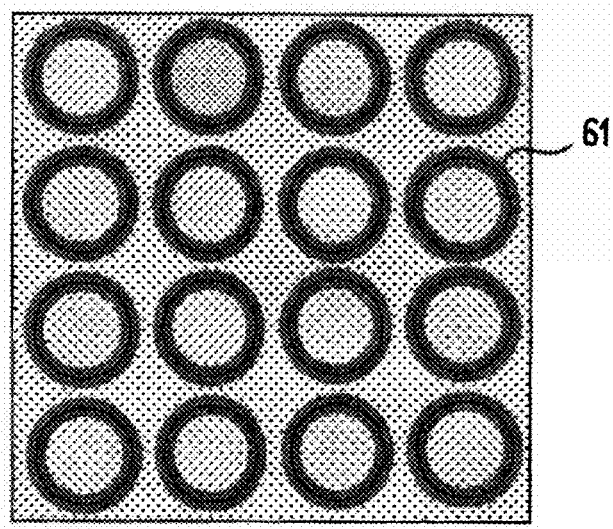

In FIG. 13, the material comprises regions 61 of different compressibility facing each cover, so that it compresses the edge of the cover more than the centre; the advantage is that this leaves a greater compression margin in the centre whilst mechanically blocking the edges, which sets up a "virtual cut-out" through the sole properties of the material used.

Figure 14:
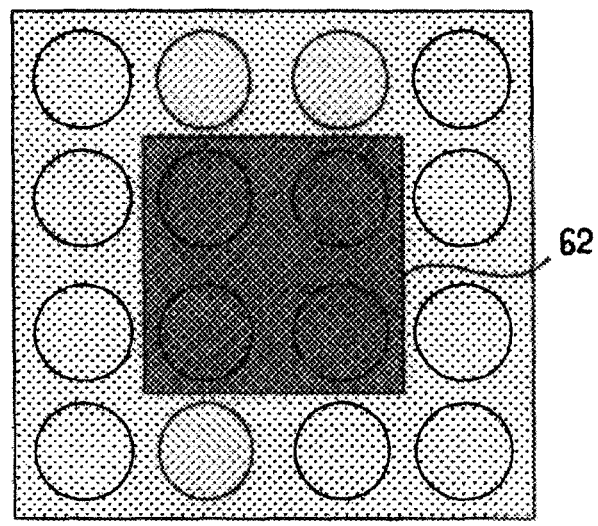
FIG. 14 shows another variant in which regions of different compressibility are formed in the vicinity of the hottest parts of the module.

FIG. 14 shows the case in which it is chosen to use a material whose compression in the central region of the module is greater than that on the edges of the module, so as to have greater compression on the covers in the central region 62 which undergoes greater heat stresses than on the edges where the energy storage assemblies are better cooled. This particular arrangement makes it possible to better take into account a shorter lifetime of the storage assemblies located in the centre of the module, compared with the lifetime of the storage assemblies located on the periphery of the module, and to balance out individual data on the storage assemblies taking into consideration their arrangement in the module. In addition, a greater compression in the centre may allow delayed swelling of the storage assemblies which undergo greater thermal stresses, and thereby reduce imbalance of the internal resistance of the module.

Figure 15:
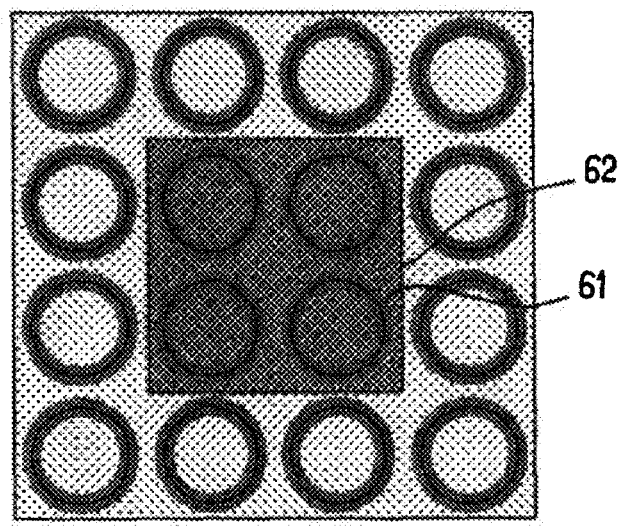
FIG. 15 shows the possible combination of FIGS. 13 and 14.

FIG. 15 combines the advantages described with reference to FIGS. 13 and 14, by accumulating greater compressibility in the central region of the module with more emphasized differential compressibility on the edges of each of the storage assembly covers located in said central region.

Figure 16:
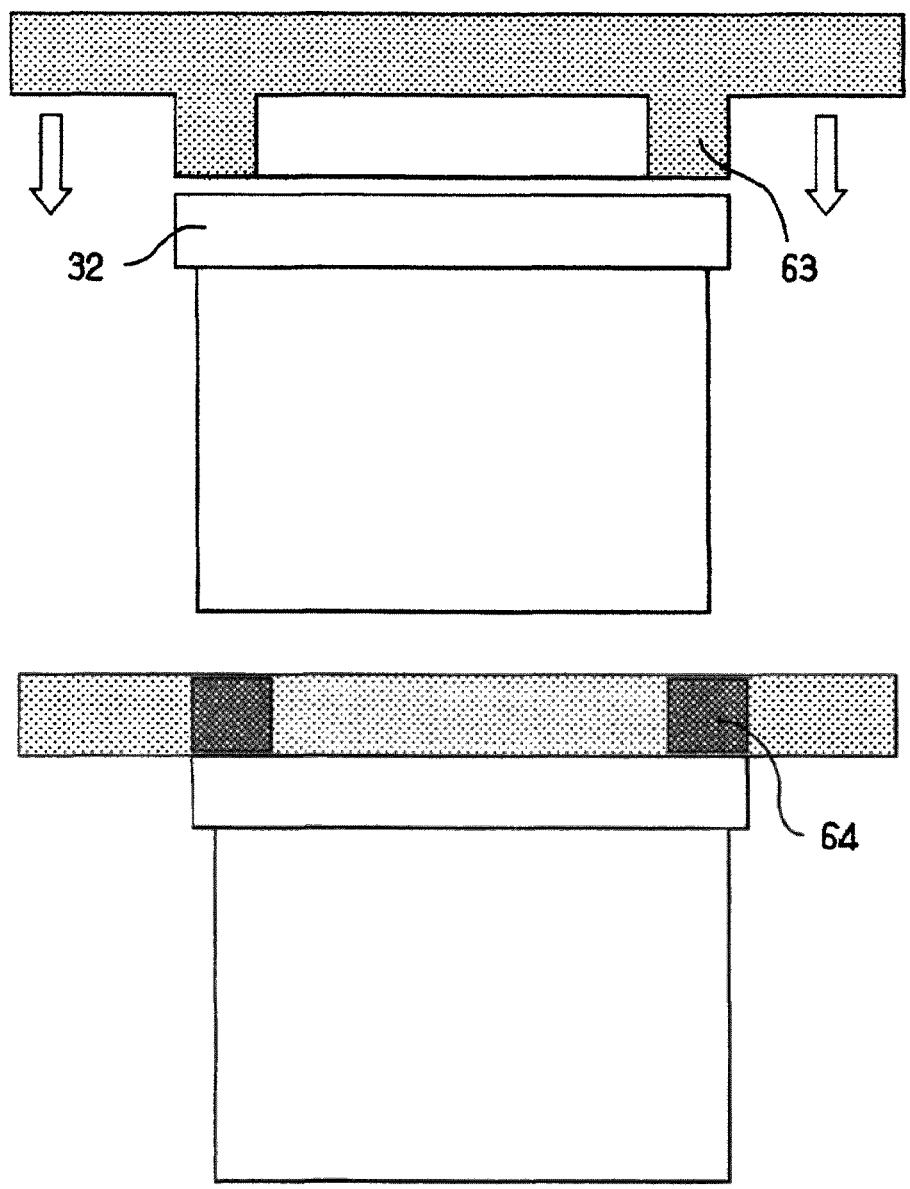
FIG. 16 shows means to obtain different compressibilities according to the variants in FIGS. 13 to 15, before sealing the casing of the module as in the top part of the Figure, and after sealing as shown in the lower part.

The manner in which different compressibility can be obtained in an annular region on the edge of the covers can be the manner shown FIG. 16:

The top of the Figure shows the compressible material before sealing of the module, it is ascertained that the material comprises a thickened annular region 63 so that, once compressed, this region 64 (shown in the lower part of the drawing) has a higher compression value than the remainder of the material.

Regarding the choice of type of material for the covers of the storage assemblies, it is preferable to use an electrically conductive material able to undergo deformations, and forming a barrier against the gases generated in the storage assemblies during their operation. The thickness of the covers is also chosen so as to allow swelling thereof in relation to the constituent material of said cover.

Preferably, the chosen material is aluminium, and more precisely aluminium having an aluminium content of more than 99.5%. The mechanical properties of an aluminium alloy are directly related to its purity: the fewer impurities it contains, the more easily it is able to deform.

If the module comprises a plurality of storage assemblies, a cut-out 16 is associated with each storage assembly 20.

If the device comprises several storage assemblies, these are electrically connected two by two by means of connection means 30.

In one embodiment, the connection means 30 forming the electric connection between two adjacent storage assemblies 20 comprise two covers 32, respectively associated with the two storage assemblies 20, and a terminal strip 31.

The dimensions of the cut-out are designed so that at least one portion of the edge of the cut-out 16 is in thermal contact with whilst being electrically insulated from the connection means 30.

FIG. 2 illustrates two different examples of thermal contact between the connection means 30 and the cut-out 16.

In one example (left part of the schematic), the edges of the cut-out 16 are in thermal contact with whilst being electrically insulated from the cover 32.

In the other example (right side of the schematic) the edges of the cut-out 16 are in thermal contact with whilst being electrically insulated from the terminal strip 31.

In these two examples, deformation of the cover 32 (and of the terminal strip) is allowed through the presence of the cut-out 16.

To allow thermal contact whilst ensuring electrical insulation, the cut-out in some variants comprises a layer of elastomer material at least on its edge in thermal contact with and electrically insulated from the connection means 30.

Figure 3A:
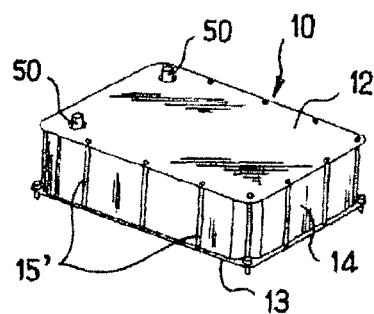
Figure 3B:
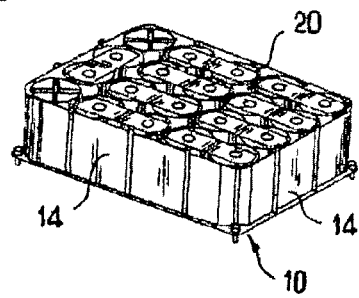

With reference to FIG. 3a, an embodiment of the module is illustrated intended to be connected via voltage terminals 50 to an annex device (not shown).

The module comprises a casing 10 in which electric energy storage assemblies 20 are arranged connected by connection means 30.

Figure 11:
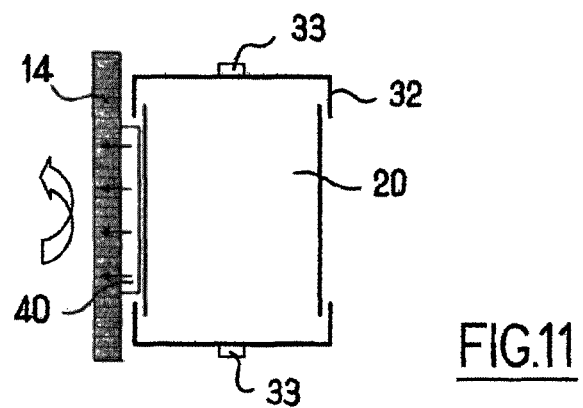

The module also comprises an electronic management board 40 for energy management and diagnosis of the energy assemblies 20, the board being visible FIG. 11.

The storage assemblies 20 are of globally cylindrical shape. The storage assemblies 20 are arranged side by side in the casing 10. In other words, the axes of revolution of the storage assemblies 20 are parallel. In other variants, not shown here, the storage assemblies may be of parallelepiped, square, oval, hexagonal shape without modifying the general principles of the invention.

In the embodiment illustrated FIGS. 3a to 3d, the storage assemblies 20 are arranged so that their axes of revolution are perpendicular to the upper 12 and lower 13 walls of the casing 10.

Advantageously, the different walls 12, 13, 14 of the casing 10 are respectively in thermal contact with whilst being electrically insulated from:

regarding at least one wall, the heat dissipation elements connected to the electric energy storage assemblies, regarding at least one other wall, the electronic management board.

This promotes cooling of the module.

The thermal connection of the storage assemblies with a first wall 12, 13, and of the electronic management board 40 with a second wall 14 different from the first wall 12, 13, allows maximum dissipation of heat emitted by the board 40 and the storage assemblies 20 towards outside the module.

The heat dissipation elements may comprise the connection means 30.

The dissipation elements 38 (see FIGS. 2 and 4) may also comprise a layer of elastomer arranged between the connection means 30 and the wall of the casing in thermal contact with the storage assemblies 20.

The elastomer layer covers several functions simultaneously. It provides:
  electrical insulation of the storage assemblies 20 from the casing 10 by means of a breakdown voltage of more than 1 kV,
  the absorption of geometric dispersions of the storage assemblies 20 due to manufacturing tolerances, by means of its compression capability,
  improved heat exchanges between the storage assemblies 20 and the outside of the module.

In one advantageous embodiment, the wall in contact with the heat dissipation elements is the lower wall 13 of the casing 10, and the wall in contact with the electronic management board 40 is a side wall 14 of the casing 10.

The storage assemblies 20 preferably conduct heat along their axis of revolution (longitudinal axis) so that axial cooling of the storage assemblies 20 is more efficient than radial cooling thereof.

Depending upon embodiment, the storage assemblies 20 are thermally connected either to the upper wall 12, or to the lower wall 13, or to the upper and lower walls 12, 13 of the casing 10.

In the embodiment illustrated FIG. 4, the storage assemblies 20 are thermally connected to the upper and lower walls 12, 13. Fins 15, 15' improve cooling of the assembly.

The thermal contacting of the storage assemblies with two walls makes it possible to improve cooling of the storage assemblies through an increase in the surface area of heat exchange between the storage assemblies 20 and outside the module.

The Casing

The casing 10 allows handling of the module, reinforces electric insulation and protects the core of the module and its electronics against potential external attack.

This casing may be parallelepiped, to be arranged in the place currently taken up by a battery of an automotive vehicle, or it may be cylindrical to be housed for example in the space freed by a spare wheel, or prismatic, in all cases defining upper and lower faces and side faces.

In one embodiment, the upper 12, lower 13 and side walls 14 of the casing 10 are in anodized aluminium firstly to promote cooling of the module via improved radiating dissipation, and secondly to reinforce the module's corrosion resistance.

Therefore, use of the walls 12, 13, 14 in aluminium or in carbon composite material provides improvement in heat conduction between the inside and outside of the casing, compared with walls in plastic material or in steel with identical mechanical characteristics. This increases the efficacy of cooling of the storage assemblies 20 and of the electronic board 40.

In some variants of embodiment of the invention, the casing 10 comprises fins 15 as illustrated FIGS. 4 and 5.

These fins provide an increased contact surface between the casing 10 and the outside medium to promote heat exchanges with the outside. This improves cooling of the module.

The fins 15 can be arranged on at least one outer face of a wall 12, 13, 14 of the casing 10. The stiffeners 15' arranged on the side walls also form fins in the meaning of the present patent, since they allow the convective exchange surface of the walls to be increased.

For example, in one embodiment, the fins 15 are arranged on the outer face of the wall of the casing in thermal contact with the storage assemblies 20, so as to improve cooling of said storage assemblies 20.

In the embodiment illustrated FIG. 4, the fins 15 are arranged in a central region 11 of the outer face of the upper wall 12 of the casing 10.

This facilitates evacuation of the heat produced by the assemblies 20 positioned in the centre of the casing 10 (i.e. the assemblies 20 the most distant from the side walls 14) and for which evacuation of heat is more difficult than for the assemblies 20 positioned on the periphery of the casing 10 (i.e. the assemblies 20 the closest to the side walls 14).

In another embodiment, the fins 15 are arranged on the outer face of the wall of the casing 10 in thermal contact with the electronic management board 40, so as to improve cooling of said electronic management board 40.

Advantageously, in another embodiment the outer faces of the walls 12, 13, 14 in thermal contact firstly with the storage assemblies 20 and secondly with the electronic board(s) 40, comprise fins 15.

If several walls of the casing are in thermal contact with the storage assemblies and/or with the electronic management board(s), all these walls in thermal contact, or only some of these walls, may comprise fins on their outer face.

To further improve evacuation of the heat produced by the storage assemblies 20, in one variant of embodiment of the invention, the wall in thermal contact with the storage assemblies 20 comprises, or is associated with, a base (not shown) in which a cooling device (not shown) is arranged.

The cooling device may comprise a circulation circuit for a cooling liquid.

If several walls of the casing are in thermal contact with the storage assemblies, the module may comprise a cooling device in only one or in all the walls in thermal contact with the assemblies 20.

This allows improved cooling of the module by taking advantage of an external cooling system e.g. of a vehicle using the module, such as a vehicle air-conditioning circuit.

Electric Energy Storage Assembly

In the embodiment illustrated FIGS. 3a to 3d, the module comprises twenty electric energy storage assemblies 20. The storage assemblies are of globally cylindrical shape.

The storage assemblies 20 are arranged in the casing 10, parallel to one another and parallel to the side walls of the casing. In other words, the axes of revolution of the storage assemblies 20 are parallel to each other and parallel to each plane along which a respective side wall extends.

In the embodiment illustrated FIGS. 3a to 3d, the storage assemblies 20 are arranged so that their axes of revolution are perpendicular to the upper 12 and lower 13 walls of the casing 10.

The storage assemblies 20 are connected two by two by the connection means 30, which will be described in detail in the remainder of the description.

It will be noted that in the embodiment illustrated FIGS. 3a to 3d, the twenty electric energy storage assemblies 20 are connected in series.

These storage assemblies 20 are connected two by two at their upper 32 and lower covers alternately. In other words, with reference to one storage assembly, this is connected by its upper cover to a first adjacent storage assembly, and by its lower cover to a second adjacent storage assembly different from the first storage assembly.

Evidently, configurations other than the configuration in series can be adopted, in relation to applications. For example, for a module comprising twenty storage assemblies 20 one pair of ten storage assemblies 20 in series can be connected in series, and this pair can then be connected in parallel, etc.

The storage assemblies are electrically insulated from the walls 12, 13, 14 of the casing.

Electronic Management Board

In the embodiment illustrated FIGS. 3a to 3d, the device also comprises four electronic management boards 40.

The electronic management board 40 is used to manage charging and discharging, and the diagnosis of the energy storage assemblies 20. By diagnosis here is meant all measurements of temperature, pressure, voltage and current allowing measurement and/or calculation of the charge status or health status of the module throughout its active lifetime.

In particular, the electronic board can meet two separate needs:
- balancing of end-charge voltages of the storage assemblies 20 of the module,
- voltage instrumentation of the module.

The storage elements 20 effectively have characteristics (capacity, resistance) showing dispersions due to manufacture and/or ageing, etc.

These differences mean that when charging the module, not all the storage assemblies 20 have the same charge voltage.

Balancing therefore comprises homogenization of these voltages around one same voltage value defined in relation to the intended application.

The electronic management board is connected in parallel to the storage assemblies associated in series.

The electronic management board 40 is electrically insulated from the walls of the casing 10.

An electronic management board 40 comprises a layer of epoxy resin 42 on which a copper printed circuit 41 is bonded.

The layer of epoxy resin 42 allows the thermal contacting of the copper printed circuit 41 with, whilst ensuring its electric insulation from, the casing 10.

The electronic management board 40 is arranged so that the layer of epoxy resin 42 comes into contact with the inner face of the wall 14 of the casing 10.

In the remainder hereof it is to be understood that when an element A is mentioned as being "on" an element B, it may lie directly on element B or it may be positioned above element B but separated from element B by one or more other intermediate elements.

It is also to be understood that when an element A is mentioned as being "on" an element B, it may cover the entire surface of element B or only a portion of element B.

Figure 10:
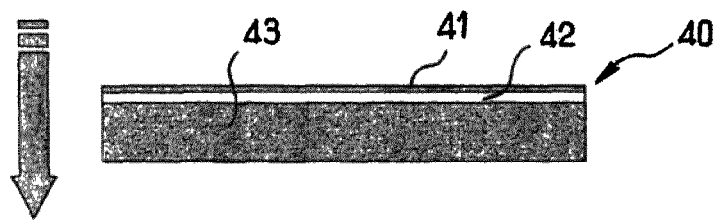
FIGS. 10 and 11 illustrate examples of an electronic management board of the module.

In one embodiment illustrated FIG. 10, the electronic management board 40 comprises an aluminium plate 43 on the layer of epoxy resin 42 (so that the layer of epoxy resin is positioned between the copper printed circuit and the aluminium layer).

In this case, it is the aluminium plate which is placed in contact with the inner face of wall 14 of the casing 10.

Evidently, the electronic boards 40 can be arranged outside the casing and in this case are thermally connected to the outer faces of the side walls of the casing. The advantage of said arrangement is that cooling of the boards is further improved and their maintenance made easier without having to open the casing, but it has the disadvantage of more easily exposing the boards to outside impact and of requiring improved sealing of the casing walls.

The presence of an aluminium layer 43 on the electronic management board 40 promotes the evacuation of heat from the copper printed circuit 41 towards the wall 14 of the casing in contact with the electronic management board 40.

Advantageously, the module may comprise as many electronic management boards 40 as the casing 10 comprises side walls 14.

In the embodiment illustrated FIGS. 3a to 3d, the module comprises four electronic management boards 40 thermally connected to the inner faces of the four side walls 14 of the casing 10.

The presence of four electronic boards on the four side walls of the module prevents the storage assemblies positioned on the periphery of the casing from cooling quicker than the storage assemblies 20 positioned in the centre of the casing.

The electronic boards 40 in this case effectively act as heat buffer. The presence of these heat buffers on the side walls means that the storage assemblies 20 arranged in the vicinity of the side walls 14 will cool less quickly, so that all the storage assemblies 20 of the module will cool at the same rate.

Heat being the main cause of ageing of storage assemblies 20, homogenization of the temperature inside the module leads to homogenized ageing of the storage assemblies 20 of the module.

Evidently, the number of electronic boards will be optimized in relation to the thermal result to be achieved, without the number of boards necessarily being identical to the number of side walls of the casing, in particular when the casing is of circular or complex shape due to the particular environment in which the module is to be used.

Connection Means

Figure 6:
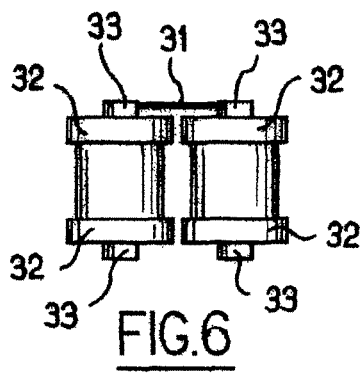
FIGS. 6 to 9 illustrate examples of connection means to connect together the energy storage assemblies inside the module.

In one embodiment illustrated FIG. 6, the connection means 30 between two adjacent storage assemblies 20 comprise two covers 32 electrically connected by a terminal strip 31.

Each cover 32 is intended to cap a storage assembly 20.

Each cover 32 comprises a connection terminal 33 intended to be in contact with a through borehole (not shown) of the terminal strip 31. To improve electric conduction between the terminal 33 and the terminal strip 31, the surface condition of the through borehole can be made rough to increase the contact surface.

In one embodiment, the terminal strips 31 are in copper. This allows the ohmic resistance of the connection means 30 to be reduced, and hence minimizes losses through Joule effect. Therefore the production of heat by the connection means 30 is reduced inside the module.

In another embodiment, the terminal strips 31 are in aluminium. This improves the weight of the connection means whilst maintaining ohmic resistance between the storage assemblies and satisfactory heat conduction between the storage assemblies 20 and the casing 10.

In one variant, the terminal strips 31 may be coated with a surface treatment of nickel or tin plating type to protect against corrosion, but also to improve electric contact.

For each storage assembly 20, the upper cover 32 of the assembly 20 is electrically connected with the upper cover 32 of an adjacent assembly, whilst the lower cover of the same assembly is electrically connected with the lower cover of another adjacent storage assembly, so that each storage assembly 20 can be connected to two adjacent storage assemblies 20, one at its upper cover 32 and the other at its lower cover.

Figure 7:
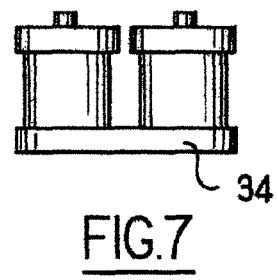
Figure 7A:
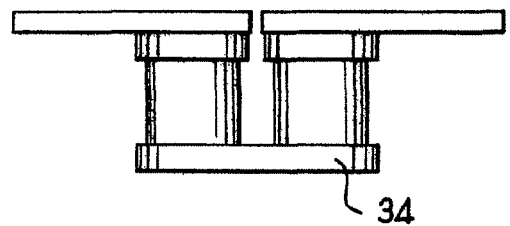

In the embodiment shown FIG. 7a, the energy storage assemblies have flat covers without a connection terminal. They are then welded or brazed in pairs with their neighbours by means of terminal strips welded or brazed in the same arrangement as described in the preceding paragraph. If laser transparent welding is used, the terminal strips may have preferential thinned regions, similar to those described below with reference to the welding of bi-covers.

The contact surface between the terminal strip 31 and a cover 32 is preferably equal to or greater than one quarter of the surface of the cover 32, and further preferably equal to or greater than one half of the surface of the cover 32, even equal to the entirety of the cover surface.

With this configuration of the storage assemblies it is possible to maximize the contact surface between the terminal strip 31 and the cover, and hence to promote heat exchanges between the cover and the casing through the terminal strip 31.

Figure 8:
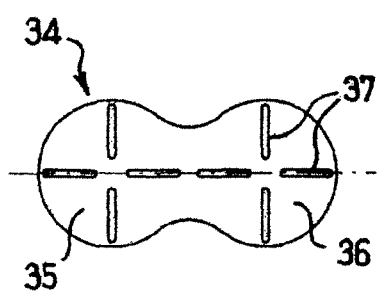
Figure 9:
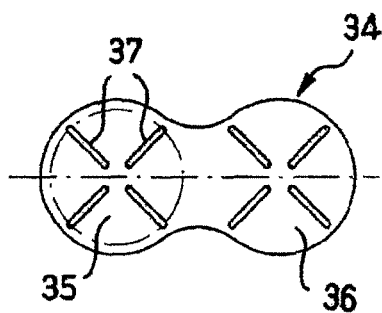

In another embodiment illustrated FIGS. 7, 8 and 9, the connection means 30 comprise a longitudinal part 34, called a bi-cover, whose ends 35, 36 form the upper or lower covers of two adjacent storage assemblies 20 for their electrical connection.

The use of the longitudinal part 34 for electrical connection of two adjacent storage assemblies makes it possible to increase the electrical and thermal performance of the modules.

Regarding electrical performance, the use of connection means made in a single piece makes it possible to reduce the internal resistance of the connection means (and hence the production of heat through Joule effect). Regarding thermal performance, the use of connection means in a single piece, able to form upper (or lower) covers of two storage assemblies, provides increased surface contact between the storage assemblies 20 and the walls of the module, which promotes thermal diffusion towards the casing 10.

If the bi-covers are joined by laser transparent welding, each end 35, 36 of the bi-cover 34 comprises preferential thinned regions 37 to form welding regions.

In the embodiments illustrated FIGS. 8 and 9, the preferential thinned regions 37 are radial and perpendicular two by two.

In the embodiment illustrated FIG. 8, a preferential thinned region 37 of each end 35, 36 extends along the longitudinal axis B-B of the longitudinal part 34.

It is thereby possible to reduce the internal resistance of the longitudinal part 34 (and hence heat production through Joule effect of the connection means 30). However, in this case, the current circulates chiefly at the rectilinear thinned regions extending along the longitudinal axis B-B of the longitudinal part 34. This may cause local heating of the longitudinal part at the rectilinear thinned regions extending along the longitudinal axis B-B of the longitudinal part 34.

In the embodiment illustrated FIG. 9, the radial rectilinear thinned regions 37 are perpendicular two by two and have an angle of 45° with the longitudinal axis of the part. It is thereby possible to avoid the risks of deterioration related to local heating as above-mentioned.

ALTERNATIVES

Readers will appreciate that numerous modifications may be made to the module described in the foregoing without materially departing from the novel teachings and advantages described herein.

Therefore any modifications of this type are intended to be incorporated in the scope of the module such as defined in the appended claims.

For example, the number of storage assemblies of the module can be greater or lesser than 20. For example, the module may comprise two electric energy storage assemblies, or more than two storage assemblies.

Figure 7B:
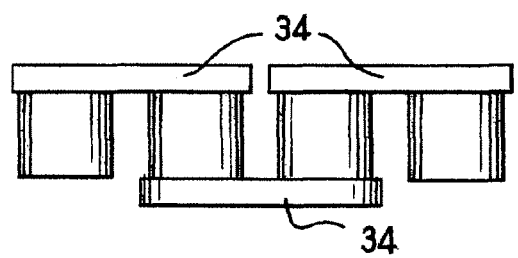
Figure 7C:
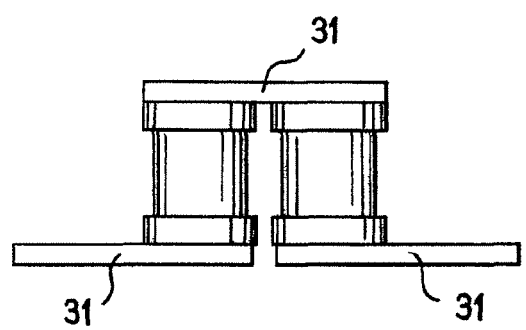
Figure 7D:
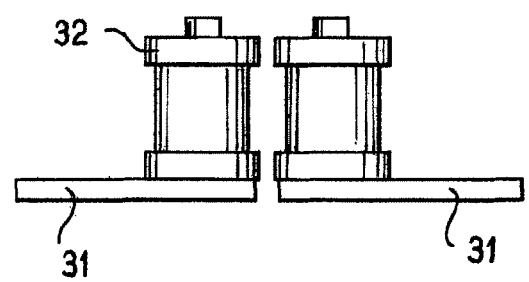

For example, the energy storage elements may be connected together by a combination of the means described above:
- bi-covers on bottom-side and covers with terminals on topside (FIG. 7);
- bi-covers on bottom-side and welded or brazed flat covers on topside (FIG. 7a);
- bi-covers on bottom-side and topside (FIG. 7b);
- terminal strips welded on topside and bottom-side (FIG. 7c);
- covers with terminals on topside and welded terminal strips on bottom side (FIG. 7d);
- covers with terminals on top and bottom side (FIG. 6).

in relation to assembly constraints and manufacturing needs.

Similarly, embodiments may be contemplated in which the edges of the cut-out 16 are in thermal contact with, whilst being electrically insulated from the storage assembly 20. For example, for the case in which the cover is set inside the assembly. In this case, the cover 32 is joined to the inner face of the side wall of the storage assembly 20, in the vicinity of its upper end (so that the cover 32 globally extends below the upper edge of the storage assembly 20). Embodiments may also be considered in which the cut-out is in thermal contact with, whilst being electrically insulated from both the cover 32 and the storage assembly 20.

Additionally the casing, for each storage assembly, may comprise more than one cut-out. In particular, for each storage assembly, the casing may comprise two cut-outs, one made in the inner face of the upper wall and the other made in the inner face of the lower wall.

Similarly, and without departing from the scope of the invention, the invention also covers the case in which the cut-outs are located facing the lower wall, and hence in which the swelling of the storage assemblies takes place in the lower part of the module.

Also, the number of electronic management boards may be greater or less than 4. For example, the module may comprise a single management board.

In this case, the two storage assemblies are thermally connected to a first wall and the electronic management board is connected to a second wall—different from the first wall—so as to increase heat exchanges with the outside, and hence promote evacuation of the heat produced by the storage assemblies, the connection means and the electronic management board.

Also, the different embodiments described above presented:
- the storage assemblies as being thermally connected either to the lower wall of the casing or to the upper wall of the casing, or to the upper and lower walls of the casing, and
- the electronic management board as being connected to one, two, three or four side walls of the casing.

Similarly, the geometric arrangement of the storage elements is described above as being square, but it may also be of any shape such as triangular, parallelogram, hexagonal, octagonal, etc.

Advantageously readers will appreciate that the thermal connections of the storage assemblies and of the electronic management boards may be reversed, namely:

the storage assemblies may be connected to one or more side walls of the casing, e.g. if the energy storage elements are arranged flat to comply with axial evacuation of heat towards outside the casing.

the electronic management boards may be connected to the upper wall or to the lower wall, or to the upper and lower walls.

To simplify the description, we have described modules extending globally vertically. Evidently, the modules could be oriented in any direction without departing from the scope of the invention.

Also, in the present description, the storage assemblies and their orientation have been defined with respect to storage assemblies having a circular cross-section. Evidently, the storage assemblies could have any cross-section.

Finally, the foregoing descriptions have been proposed with respect to a module construction comprising a single level of storage assemblies, but evidently the invention may also be applied to modules comprising several layers of storage assemblies, the heat exchanges with the casing applying to the outer layers of the plurality of storage assemblies.

The invention claimed is:

1. Module comprising a casing in which a plurality of electric energy storage assemblies are arranged, each electric energy storage assembly extending along a longitudinal axis, the electric energy storage assemblies being arranged in the casing so that their longitudinal axes are parallel to one another and are perpendicular to an upper wall and a lower wall of the casing, each electric energy storage assembly comprising a first face in thermal contact with whilst being electrically insulated from the lower wall of the casing, and a second face opposite the first face, the second face being capped with a cover electrically connected to said electric energy storage assembly, wherein the upper wall of the casing comprises means for holding the first faces of the electric energy storage assemblies against the lower wall of the casing and which also allow swelling of the covers capping the second faces, the swelling of the covers being due to an increase of the internal pressure of the electric energy storage assemblies caused by the production of gases in the electric energy storage assemblies, wherein the means for holding comprise at least one of a cutout in the upper wall to allow said swelling and a compressible material disposed between the upper wall and a connector provided on the second faces of the electric energy storage assemblies, wherein the compressible material fills the space between the upper wall and the connector, said material being compressed to a nominal value lower than its maximum compression value to allow swelling of the electric energy storage assemblies by a thickness lying between a thickness corresponding to said nominal value of the material and a thickness corresponding to the maximum compression value of said material.

2. Module according to claim 1, wherein the compressible material comprises regions of different compressibility.

3. Module according to claim 1, wherein the compressible material comprises regions of different compressibility facing each cover of each electric energy storage assembly, the region facing the central part of each cover being less compressible that the region facing the circumference of each cover.

4. Module according to claim 1, wherein the compressible material comprises regions of different compressibility in relation to their position facing covers which undergo different temperatures depending on their location in the module.

5. Module according to claim 1, wherein said means to hold the storage assembly in place comprise at least one cut-out on the inner face of the upper wall of the casing opposite the cover, the cut-out extending over the storage assembly and being designed so that at least one portion of the edge of the cut-out is in thermal contact with whilst being electrically insulated from: the storage assembly and/or connection means of at least two storage assemblies.

6. Module according to claim 5, wherein the cut-out is a blind hole of similar cross-section to the cover, the dimensions of the blind hole being smaller than those of the cover of the associated storage assembly.

7. Module according to claim 5, wherein the cut-out is a blind hole of circular cross-section, the diameter of the blind hole being smaller than that of the associated storage assembly.

8. Module according to claim 5, wherein the connection means between two adjacent storage assemblies comprise the covers associated with the two storage assemblies and electrically connected to a terminal strip, each cover being intended to be in electrical contact with one end of the terminal strip.

9. Module according to claim 8, wherein the connection means between two storage assemblies comprise the covers associated with the two storage assemblies and electrically connected to a terminal strip, each cover comprising a connection terminal intended to be in electrical contact with one end of the terminal strip at a borehole passing through the terminal strip.

10. Module according to claim 9, wherein the borehole passing through the terminal strip has high surface roughness to promote electrical contact with the connection terminal.

11. Module according to claim 8, wherein the terminal strip is in copper.

12. Module according to claim 8, wherein terminal strip is in aluminium.

13. Module according to claim 8, wherein the terminal strips comprise tin or nickel plating as surface protection and/or improved electrical contact.

14. Module according to claim 5, wherein the connection means between two adjacent storage assemblies comprise two covers electrically connected by a terminal strip joined by laser transparent welding.

15. Module according to claim 14, wherein welding of the terminal strip is made through preferential thinned regions.

16. Module according to claim 5, wherein the connection means between two adjacent storage assemblies comprise two covers electrically connected via a terminal strip brazed onto the covers.

17. Module according to claim 5, wherein the connection means between two adjacent storage assemblies comprise two covers electrically connected by a terminal strip by diffusion-brazing of the terminal strip onto the covers.

18. Module according to claim 5, wherein the cut-out comprises a layer of elastomer material at least on its edge in thermal contact with, whilst being electrically insulated from: the storage assembly, and/or the connection means of the two storage assemblies.

19. Module according to claim 5, wherein the connection means between two adjacent storage assemblies comprise a longitudinal part whose ends form the respective upper or lower covers of each of the adjacent storage assemblies so as electrically to connect said adjacent storage assemblies.

20. Module according to claim 19, wherein each end of the longitudinal part comprises radial, preferential thinned regions.

21. Module according to claim 19, wherein the preferential thinned regions lie perpendicular two by two and have an angle of 45° with the longitudinal axis of the longitudinal part.

22. Module according to claim 19, wherein the preferential thinned regions lie perpendicular two by two, at least one region of each end extending along the longitudinal axis of the longitudinal part.

23. Module according to claim 1, wherein the module comprises a layer of elastomer material on the inner face of the lower wall of the casing.

24. Module according to claim 1, wherein the casing comprises fins on at least one outer face of the casing.

25. Module according to claim 24, wherein the fins are arranged on the outer face of the wall of the casing in thermal contact with the storage assemblies.

26. Module according to claim 1, wherein the casing is in aluminium.

27. Module according to claim 1, wherein the casing is in a carbon composite material.

28. Module according to claim 1, wherein at least one wall in thermal contact with and electrically insulated from the storage assemblies comprises or is associated with a base in which a cooling device is arranged.

29. Module according to claim 28, wherein the cooling device comprises a circulation circuit of cooling liquid.

30. Module according to claim 1, wherein it further comprises an electronic board for energy management and diagnosis of the storage assemblies.

31. Module according to claim 30, wherein the electronic management board is in thermal contact with whilst being electrically insulated from at least one side wall of the casing.

32. Module according to claim 31, wherein the electronic management board is in contact with the inner face of the side wall of the casing.

33. Module according to claim 31, wherein the management board is in contact with the outer face of the side wall of the casing.

34. Module according to claim 30, wherein the electronic management board comprises a layer of epoxy resin on which a copper printed circuit is bonded.

35. Module according to claim 34, wherein the layer of epoxy resin is in contact with the inner face of the side wall of the casing.

36. Module according to claim 34, wherein the electronic management board comprises an aluminium plate on the epoxy resin layer, the aluminium plate being in contact with the inner face of the other wall of the casing.

37. Module according to claim 30, wherein it comprises as many electronic management boards as the casing comprises side walls, each of said boards being in contact with a respective side wall of the casing.

38. Module according to claim 1, wherein the two walls are in thermal contact with whilst being electrically insulated from the energy storage assemblies.

39. Module according to claim 38, wherein the two walls in thermal contact with the energy storage assemblies are the upper and lower walls of the casing.

40. Module according to claim 1, wherein the covers of the assemblies consist of an electrically conductive material able to undergo deformations, and forming a barrier against the gases generated in the assemblies during their operation.

41. Module according to claim 40, wherein the covers of the assemblies are in aluminium.

42. Module according to claim 41, wherein the covers of the assemblies are in aluminium, whose aluminium content is more than 99.5%.

43. Module according to claim 1, wherein it comprises means to detect swelling of the or of each energy storage assembly.

44. Module according to claim 43, wherein the swelling detection means consist of a pressure sensor arranged inside the shell of the module facing each assembly.

45. Module according to claim 43, wherein at the swelling detection means consist of a deformation sensor located on the covers or on the terminal strips.

46. Module according to claim 43, wherein the swelling detection means consist of a switch giving data on swelling of the energy storage assembly under consideration.

47. Module according to claim 43, wherein the data delivered by the swelling detection means is processed by one or more electronic boards for energy management and diagnosis of the energy storage assemblies.

48. Module according to claim 43, wherein the data delivered by the swelling detection means is transmitted by a connector of the module to external electronic means for energy management and diagnosis of the energy storage assemblies.

49. Module according to claim 1, wherein the compressible material comprises regions of different compressibility.

50. Module according to claim 49, wherein the compressible material comprises regions of different compressibility facing each cover of each energy storage assembly, the region facing the central part of each cover being less compressible than the region facing the circumference of each cover.

51. Module according to claim 49, wherein the compressible material comprises regions of different compressibility in relation to their position facing covers which undergo different temperatures depending on their location in the module.

* * * * *

UNITED STATES PATENT AND TRADEMARK OFFICE
CERTIFICATE OF CORRECTION

| | | |
|---|---|---|
| PATENT NO. | : 8,906,531 B2 | Page 1 of 1 |
| APPLICATION NO. | : 12/599961 | |
| DATED | : December 9, 2014 | |
| INVENTOR(S) | : Olivier Caumont et al. | |

It is certified that error appears in the above-identified patent and that said Letters Patent is hereby corrected as shown below:

On the Title Page, in Item [73], under Assignee, please delete "Soloutions" and insert --Solutions--.

Signed and Sealed this
Twenty-third Day of June, 2015

Michelle K. Lee
*Director of the United States Patent and Trademark Office*